April 1, 1969   J. R. WALTERS   3,436,692
SATURABLE REACTOR CONSTRUCTION
Filed Aug. 4, 1966

INVENTOR
Joseph R. Walters
by McDougall, Hersh,
Scott and Ladd
Att'ys

United States Patent Office 3,436,692
Patented Apr. 1, 1969

3,436,692
SATURABLE REACTOR CONSTRUCTION
Joseph R. Walters, Elk Grove Village, Ill., assignor to Electran Manufacturing Company, Oak Park, Ill., a corporation of Illinois
Filed Aug. 4, 1966, Ser. No. 570,348
Int. Cl. H02p *13/04*
U.S. Cl. 333—76           10 Claims

ABSTRACT OF THE DISCLOSURE

A saturable reactor construction including a set of inner legs and a set of outer legs disposed on opposite sides of the inner set. Alternating and direct current windings are provided on the inner legs. The dimensions of the inner legs are such that the width of the inner legs is between 60 and 83.3 percent of the width of the outer legs. In addition, the space separating the inner legs is dimensioned to be less than the width of one of the inner legs.

---

This invention relates to an improved saturable reactor. The invention is particularly concerned with a saturable reactor construction which is designed for purposes of providing significantly improved performance characteristics.

Saturable reactors have been widely produced, and the physical and electrical characteristics of these reactors are well known. Such reactors generally consist of a lamination formed of a stack of metal sheets. The respective sheets in the lamination are of an integral construction and openings are defined through the sheets whereby registering of the openings in the lamination provides a plurality of reactor legs.

Direct current and alternating current windings are provided around the reactor legs. The AC windings are generally connected whereby no resultant AC voltage of fundamental frequency will be induced in the adjacent DC windings. Various designs and configurations can be achieved, depending upon the performance characteristics desired.

It is a general object of this invention to provide a saturable reactor construction which is characterized by performance characteristics which cannot be achieved with constructions heretofore developed.

It is a more particular object of this invention to provide a saturable reactor construction which is characterized by dimensional relationships enabling the achievement of unique advantages in the production and use of the reactor.

These and other objects of this invention will appear hereinafter and for purposes of illustration but not of limitation, specific embodiments of this invention are shown in the accompanying drawings in which.

Figure 1:
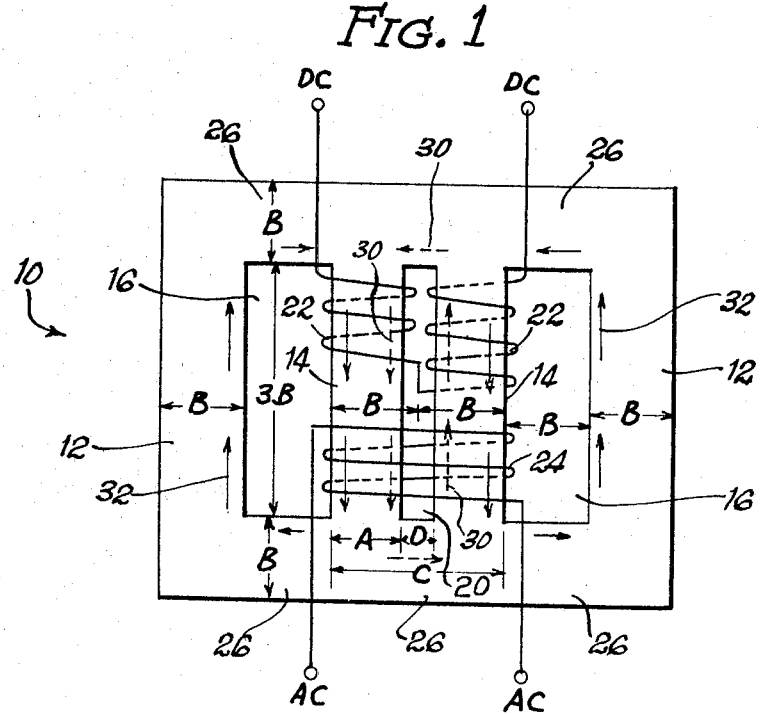
FIGURE 1 is an illustration of a reactor construction characterized by the features of this invention.

The saturable reactor construction of this invention is preferably constructed in accordance with certain standard techniques. Specifically, the reactor is adapted to be formed as a lamination comprising a stacked arrangement of metal sheets. Each of the sheets defines openings which, when registered in the lamination, provide a plurality of legs in the reactor construction.

Each of the legs of the construction is separated by spaces defined by the respective openings. AC and DC windings are provided in association with a set of inner legs in the construction.

The particular improvements of this invention primarily concern the dimensional characteristics of the reactor construction. Specifically, it has been found that the width of the inner legs should fall within a certain critical dimensional range based on the width of outer legs of the construction. Thus, each of the inner legs should have a width between 60 and 83.3 percent of the width of the outer legs.

The space separating the inner legs is such that the distance between the inner legs is less than the width of either inner leg. This dimensional arrangement cooperates with the aforementioned relationship of the inner and outer legs to provide the basic factors for achieving the advantageous results of this invention.

In selecting the width of the inner legs, it has been found that the value of 83.3 percent comprises a critical upper limit. The operating characteristics of reactor constructions are significantly affected when this value is exceeded to any significant degree. The lower limit of 60 percent is more of a practical limit since operating characteristics below the 83.3 percent value are fairly uniform. It is, of course, necessary to provide the inner legs with a size sufficient to provide proper structural characteristics.

Other dimensional factors have been determined which provide significant but less dramatic improvements in the operating characteristics of the reactor constructions. It has been specifically found that the sum of the width of one of the inner legs plus one-half the width of the space separating the inner legs should be approximately equal to the width of an outer leg.

Additional dimensional factors having practical value relate to the size of the rectangular openings defined by the reactor. The openings separating an inner leg from an outer leg should be dimensioned to separate the legs by a distance substantially equal to the width of an outer leg. The longitudinal dimension of these rectangular openings is preferably about three times the width of an outer leg.

When considering the dimensional characteristics referred to in this description and in the claims, it will be understood that the dimensions are provided for purposes of illustrating the manner in which the reactor constructions can be reproduced. The thickness of the reactors is not discussed in considering the dimensional relationships since this is, of course, a constant factor in all mathematical determinations. The thickness of the reactor constructions can be selected in accordance with standard practice.

FIGURE 1 illustrates a saturable reactor construction 10 which is characterized by the features of this invention. The construction comprises a set of outer legs 12 and a set of inner legs 14. Rectangularly shaped openings 16 separate the respective inner and outer legs while a narrow rectangularly shaped opening 20 separates the two inner legs.

The construction is adapted to be formed by stacking a plurality of metal members having the configuration shown in FIGURE 1. A laminate is thus formed, and it will be understood that the particular materials employed and the methods utilized for securing the construction may comprise any standard method.

In the particular embodiment shown, DC windings 22 are associated at one end of the inner legs 14 while an AC winding 24 is associated at the opposite end of the inner legs. The position of the windings is such that the DC windings encircle portions of each of the inner legs. The AC winding, on the other hand, spans the space defined by the opening 20 whereby each turn of the AC winding is wrapped around both legs 14. In associating the windings with the reactor, it will be understood that the windings may be superimposed in accordance with conventional techniques. With such an arrangement, however, the AC winding will still span the opening 20 while the DC windings will be wrapped around each of the respective legs.

As noted, the construction can be formed by utilizing a stack of sheets, and this arrangement provides integrally formed sections 26 which interconnect the respective legs in the construction. These interconnecting sections combine with the legs to define the spaces 16 and 20 which divide the respective legs.

The various parts of the construction are identified by the letters A, B, C and D for purposes of indicating the dimensional relationship of these parts. The letter A refers to the width of the inner legs, the letter B refers to the width of the outer legs, the letter C refers to the distance across the combined inner legs and the letter D refers to the span between the inner legs. The letter B also refers to the width of the sections 26 in accordance with the preferred form of the invention.

As indicated above, there is a critical dimensional relationship between the width of the inner and outer legs. Specifically, the value A must be between about 60 and 83.3 percent of the value of the letter B. Similarly, the distance corresponding to the letter D must be less than the value A.

Where a reactor is designed with the width of the inner legs A maintained in accordance with the above restrictions, a highly advantageous operating arrangement can be achieved. In this connection, certain operating characteristics of the construction can be observed. The arrows designated by broken lines 30 illustrate the DC flux direction. The solid areas 32 illustrate an instantaneous AC flux direction. The direction reverses every half cycle while the DC arrows are unidirectional during application of bias or control. It is to be noted that the AC windings can be arranged for series or parallel connections.

In certain saturable reactor designs, the AC coils are connected so that no resultant AC voltage of fundamental frequency is induced in the DC windings. In the operation of the arrangement of the instant invention, fundametal frequency is induced in the DC coils; however the DC connections are such that no AC voltage appears at the DC terminals. The fact that the AC winding is wound over or adjacent to the two DC coils while spanning both legs of the core is the contributing factor to this operating characteristic. The arrangement of the DC coils encompassing both legs of the core is also necessary.

It is also to be noted that in the reactor design of this invention, the DC control coils are wound on the two inner legs and connected in opposite polarity (or winding rotation) so that the AC voltage induced in the DC coils is bucked out. The AC coil is the outer coil encompassing both DC coils and both center legs. This configuration provides better control, a shorter path requiring DC saturation for control, better coupling between the AC power and DC control windings, and permits much less ampere turns in the DC control windings for a given change in magnitude of core saturation and resultant change in the impedance of the AC winding. In this connection, "encompassing" by the AC coil may comprise actual wrapping of this coil over the DC coils.

The dimensional factors considered critical to the operation of this invention have been found, in the case of certain designs, to result in considerably less control power requirements when compared with conventional structures. Where such designs utilize the instant invention, only a small part of the magnetic circuit requires saturation for control whereas conventional structures requires a significantly greater amount of power to achieve control. Variations in the control power requirements will differ considerably depending on the type of unit employed.

Another highly important result which is achieved relates to the physical size of the instant construction. Performance characteristics comparable to standard units can be achieved with constructions 40 percent smaller than standard units where the constructions employ the critical dimensional characteristics of this invention. For example, a standard unit rated at 60 kva. will weigh about 610 pounds while a design in accordance with this invention can achieve the same rating with a unit weight of about 390 pounds.

In accordance with the preferred form of this invention, the dimensions of the gap between the inner legs (the value D) is directly related to the width of the legs 12 and 14. Specifically, the sum of the width of one of the inner legs plus one-half the value D should be equal to or approximately equal to the width of one of the outer legs. Accordingly, the value C would be equal to two times the value B or, expressed in a different way, the value B would be equal to A plus one-half D.

The sections 26 should also be equal to the width of the outer legs 12 and, accordingly, the dimensions of these sections 26 are indicated by the value B.

The size of the openings 16 and 20 can also be controlled to provide the greatest efficiency from the standpoint of production and operation of the reactor. As noted in FIGURE 1, the width of the opening 16 can be equal to or approximately equal to the width of the outer legs 12. The longitudinal extent of each of the rectangular openings is three times the width (3B).

The construction of this invention is particularly satisfactory from the standpoint of leakage fields. Prior art constructions have been designed to achieve minimum leakage; however, the instant invention has been found to achieve even less leakage when compared with other designs. In this connection, the width relationship of the inner legs with respect to the outer legs and the sections 26 is an important factor. Obviously, due to the constant thickness of the reactor, the width relationships provide corresponding area relationships, the areas being defined as the width times the thickness at any particular cross section of the construction. The critical 60 to 83.3 percent relationship comprises an area relationship which is ideal from the standpoint of minimum leakage fields.

Figure 2:
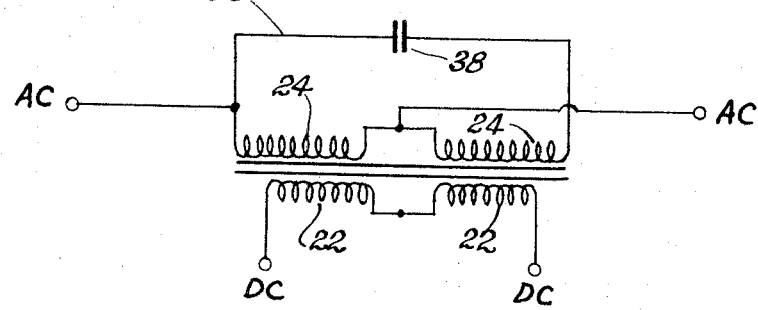
FIGURE 2 is a circuit diagram illustrating the electrical characteristics of the reactor construction.

The construction of this invention is particularly applicable where low voltages (50 v. or less) are available for control. FIGURE 2 illustrates a suitable application of the instant invention wherein DC windings 22 are employed in conjunction with AC windings 24. An extension 36 of the AC windings connects an external capacitor 38 in the circuit. This arrangement can be used for parallel resonance or near resonance with a minimum of DC control or bias applied. This provides for a greater range of impedance control.

Figure 3:
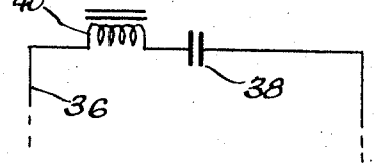
FIGURE 3 is a diagrammatic illustration of an alternative operating arrangement for a portion of the circuit of FIGURE 2.

As shown in FIGURE 3, a series AC reactor 40 is adapted to be associated with the external capacitor 38 for inclusion in the saturable reactor circuit. This provides an external resonance circuit which provides for filtering harmonics from the load side of the saturable reactor. It will be appreciated when considering FIGURES 2 and 3 that the saturable reactor construction can be employed in a variety of other circuit arrangements.

It will be understood that various changes and modifications may be made in the above described construction which provides the characteristics of this invention without departing from the spirit thereof, particularly as defined in the following claims.

That which is claimed is:

1. In a saturable reactor construction comprising an inner set of legs and an outer set of legs, and alternating current windings and direct current windings on said inner legs, the improvement wherein the width of said inner legs is between about 60 and 83.3 percent of the width of said outer legs, and wherein the space separating said inner legs is less than the width of one of said inner legs.

2. A construction in accordance with claim 1 wherein the sum of the width of one of said inner legs plus one-half the width of the space separating said inner legs is approximately equal to the width of one of said outer legs.

3. A construction in accordance with claim 1 having a generally rectangular shape, rectangular spaces defined between each of said legs, and integrally formed reactor sections interconnecting each of said legs, the sum of the width of one of said inner legs plus one-half the width of the space separating said inner legs is approximately equal to the width of one of said outer legs.

4. A construction in accordance with claim 3 wherein the width of said reactor sections interconnecting said legs substantially corresponds to the width of said outer legs.

5. A construction in accordance with claim 4 wherein the space separating each outer leg from an inner leg is substantially equal to the width of an outer leg.

6. A construction in accordance with claim 5 wherein the space separating opposed ones of said reactor sections is substantially equal to three times the width of an outer leg.

7. A construction in accordance with claim 1 wherein an extension of said AC winding is connected with an external capacitor.

8. A construction in accordance with claim 1 wherein an extension of said AC winding is connected with an external capacitor and series AC reactor combination.

9. A construction in accordance with claim 1 wherein direct current windings are individually wound on respective ones of said inner legs and wherein said alternating current windings encompass said direct current windings and span said inner legs.

10. A construction in accordance with claim 9 wherein said direct current windings are wound in opposite polarity.

References Cited

UNITED STATES PATENTS

| 2,267,382 | 12/1941 | Vance | 336—215 XR |
| 3,059,170 | 10/1962 | Je Her | 336—160 XR |

FOREIGN PATENTS 667,093  6/1931  Germany.

LEWIS H. MYERS, *Primary Examiner.*

THOMAS J. KOZMA, *Assistant Examiner.*

U.S. Cl. X.R.

323—60, 48; 336—215, 155